United States Patent Office 3,141,908
Patented July 21, 1964

3,141,908
ETHYLENE/VINYLOXYETHANOL INTERPOLYMERS
John D. Calfee, Dayton, Ohio, assignor to Monsanto Company, a corporation of Delaware
No Drawing. Filed Dec. 28, 1959, Ser. No. 862,089
2 Claims. (Cl. 260—615)

The present invention is directed to certain low molecular weight ethylene/vinyloxyethanol interpolymers characterized by low coefficients of friction. The invention is further directed to ferrous metals coated with lubricating films of ethylene/vinyloxyethanol interpolymers.

The ethylene/vinyloxyethanol interpolymers useful in the present invention are low molecular weight polymers and generally of kinematic viscosities in the range of about 5 centistokes to 10,000 centisokes at 100° F.

The interpolymers are characterized by their low coefficient of friction, particularly coefficients less than 0.130 dynes/square centimeter as measured by Kyropoulos four-ball pendulum, and by generally having weight percent of vinyloxyethanol in the interpolymer of between about 20% and about 70%. Even more advantageous coefficients of friction are obtained in the range of about 30% to about 60% by weight vinyloxyethanol, such as coefficients below about 0.115 dynes/square centimeter. The optimum cofficients of friction are found in the range of about 35% to 50% by weight vinyloxyethanol. To a considerable extent in the low molecular weight ranges under consideration, the coefficient of friction is independent of molecular weight. However, it will be desirable, nevertheless, to utilize particular ranges of molecular weights for various functional fluid and plasticizer uses in order to have proper viscosities and other properties, and it will be necessary in all cases to use fairly low molecular weights.

In general, the interpolymers of the present invention will be oils and of molecular weights from about 100 to 2000, or more specifically about 200 to 1500; but interpolymers in the form of greases or soft waxes and usually in the molecular weight range of about 2000 up to about 5000 or so have some value as lubricants or functional fluids, although in more limited applications and under conditions in which they are liquid, and are to be considered as within the present invention. The foregoing molecular weights have reference to the number average molecular weights calculated from freezing point depressions (based on determination of freezing point of dilute benzene solution in standard Beckmann apparatus). It will be realized that the physical form of the ethylene/vinyloxyethanol interpolymers will vary to some extent with the proportions of the monomers, purity of the interpolymer, possible crystallinity effects, etc., but the physical form will vary from oils to waxes in approximately the molecular weight ranges noted above, and the physical form will continue to change until the polymers become a hard wax in approximately the molecular weight range from 5000 to 10,000. Above molecular weights of 10,000, or more emphatically above 20,000, the ethylene/vinyloxyethanol polymers are true high molecular weight polymers having the tensile strengths and other properties of same; the latter molecular weight values have reference to number average molecular weights as calculated from solution viscosities.

While to a certain extent the lubricity of the interpolymers of the present invention is independent of molecular weight, it will be recognized that for most functional fluid and lubrication applications, it will be necessary for the interpolymers to be pumpable liquids under the conditions of use, and for most applications the interpolymers must have kinematic viscosities between about 5 and 10,000 centistokes at 100° F., and more often between 20 and 5,000 centistokes at 100° F. At higher temperatures, the kinematic viscosities will generally be lower, e.g., at from about 2 to 500 centistokes at 210° F., although higher viscosity material can be used if use exclusively at higher temperatures is contemplated. The viscosity index of the low molecular weight ethylene/vinyloxyethanol interpolymers of the present invention is in general approximately equivalent to that of a good grade of solvent-refined Mid-Continent lube oil stock, i.e., in the range of about 90 to 100 (ASTM D–576–41). However, the viscosity index will vary to some extent with molecular weight, proportions of monomers, etc., e.g., from about 70 to 110.

The low molecular weight interpolymers of the present invention are conveniently prepared by low pressure, free radical-catalyzed interpolymerization of ethylene and vinyloxyethanol. For this interpolymerization, any pressures less than 10,000 p.s.i. gauge are considered low pressure, e.g., pressures from 1,000 or 2,000 p.s.i., up to 8,000 or so p.s.i.; pressures around 5,000 p.s.i. are considered particularly suitable. While the molecular weight of the interpolymers is conveniently controlled by regulation of the polymerization pressures, the desired low molecular weight interpolymers could also be obtained by variance of other polymerization conditions, and the novel interpolymers are considered part of the invention regardless of their method of preparation The process of preparing the low molecular weight ethylene/vinyloxyethanol interpolymers is generally carried out under conditions suitable for the high pressure polymerization of ethylene, except for the use of the lower pressures as specified above. The polymerization is generally effected at temperatures from about 50° C. to 250° C., but is preferably carried out at temperatures from about 100° C. to about 200° C. It is possible to employ higher temperatures so long as they do not cause pyrolysis or unduly rapid reaction under the reaction conditions, and it is also possible to employ lower temperatures, even down to room temperature or the like, although the reaction will not be very rapid at low temperatures. Moreover, when catalysts which dissociate in the polymerization reaction are employed, it is preferred to employ temperatures high enough to cause such dissociation.

It is known that ethylene will polymerize at elevated temperature and pressure in the absence of catalysts, particularly if the ethylene happens to contain trace small amounts of oxygen which have a catalytic effect. However, in preparing the interpolymers of the present invention, it is preferred to employ free radical initiating catalysts to insure the preparation of high molecular weight materials in reasonable reaction times. In general, ethylene polymerization catalysts, including oxygen, are suitable. On a weight basis, about 10 to 200 parts per million of oxygen is very suitable at 20,000 to 40,000 p.s.i. ethylene. Among the preferred catalysts are the peroxide catalysts and the azo catalysts. Among the peroxide type catalysts are, for example, ditolyl peroxide, benzoyl peroxide, diacetone peroxide, succinyl peroxide, acetyl peroxide, acetylbenzoyl peroxide, metabromobenzoyl peroxide, lauroyl peroxide, 2,2-bis-t-butylperoxybutane hydrogen peroxide, zinc peroxide, peracetic acid, alkali metal persulfates, perborates and percarbonates, ammonium persulfate, perborate and percarbonate and, in general, all those peroxide compounds which are either formed by the action of hydrogen peroxide on ordinary acids or else which give rise to hydrogen peroxide on treatment with dilute sulfuric acid. These materials are peroxy compounds as defiend in Webster's International Dictionary (1935) 2nd Edition, [page 3 of Patent 2,396,920 and column 3 of Patent 2,748,170]. As examples of suitable azo catalysts may be mentioned bisbenzene diazosuccinate, the inorganic acid salts of 2,2'-diguanyl-2,2'-azopropane, 2,2'-azobis(methylisobutyrate) or 2,2'-azobis(isobutyramide).

The catalyst will ordinarily be employed in as small quantity as will produce the desired polymer in a reasonable reaction time. Moreover, the amount of catalyst has some effect on molecular weight as larger amounts of catalysts ordinarily cause the production of lower molecular weight materials. However, the amounts of catalysts employed will ordinarily be within the range of 0.0005 percent to 2 percent, based on the monomers.

The following examples illustrate certain specific embodiments of the invention:

Example 1

To a jacketed tubular reactor with the jacket maintained at 180° C., ethylene and vinyloxyethanol were continuously charged in about equal proportions by weight along with 0.2% by weight of ditertiarybutyl peroxide and polymerized at a pressure of 5,000 p.s.i. gauge. The peak temperature in the reactor was 200° C. The conversion to copolymer was better than 20%.

The interpolymer obtained by the foregoing polymerization was treated with a large volume of hot acetone and filtered to remove acetone insolubles. The acetone was then evaporated from the acetone-soluble portion of the interpolymer, which was characterized as follows:

| | |
|---|---|
| Weight percent hydroxyl | 8.23 |
| Weight percent vinyloxyethanol | 42.6 |
| Gardner-Holt viscosity (stokes) | 32 |
| Pour point, ° F. | 28 |
| Specific viscosity (measurement at 25° C. on 5% solution in pyridine) | 0.28 |

The coefficient of friction was determined by a Kyropoulos pendulum modified with a 4-ball contact (A Convenient Measurement of Friction Coefficient, H. E. Malincke, Lubrication Engineering, March-April, 1956). Polished steel balls were used as the contact in the test. The ethylene/vinyloxyethanol interpolymer proved to have a very low coefficient, 0.106 dynes/square centimeter. This compares very favorably with values for well known lubricants, e.g., 0.187 for mineral oil, 0.200 for glycerine, 0.232 for ethylene glycol, and 0.143 for a commercial polyglycol synthetic lubricant. The ethylene/vinyloxyethanol interpolymer exhibited good temperature stability as shown by relatively slight changes in viscosity when the interpolymer was maintained at 100–150° C. for several days.

Example 2

An interpolymer was prepared which had approximately the proportions of monomers of that of Example 1, but slightly higher molecular weight; the weight percentage of vinyloxy-ethanol was 42.5%, but the solution viscosity (5% in pyridine) was 0.302 compared to 0.280 for the interpolymer of Example 1. The coefficient of friction, determined as in Example 1, was 0.105, or almost exactly that of the interpolymer of Example 1. This indicates that small changes in the molecular weight of the low molecular weight interpolymers have no appreciable effect on the coefficient of friction. The interpolymer had kinematic viscosity of 2124.8 centistokes at 100° F., 74.7 centistokes at 210° F., and viscosity index of 95.3 (ASTM D-576-41).

Example 3

Ethylene and vinyloxyethanol were copolymerized in charge proportion of 1 to 3 (by weight), utilizing 1% by weight of ditertiarybutyl peroxide as catalyst. The pressure was 5,000 p.s.i., jacket temperature 165–170° C., and internal peak temperature about 185° C., and good conversion was obtained.

The interpolymer was characterized as follows:

| | |
|---|---|
| Weight percent hydroxyl | 11.59 |
| Weight percent vinyloxyethanol | 60.1 |
| Gardner-Holt viscosity (stokes) | 32 |
| Pour point, ° F. | 28 |
| Specific viscosity (measurement at 25° C. on 5% solution in pyridine) | 0.28 |

The coefficient of friction was 0.115 dynes/square centimeter. Kinematic viscosity was 4977.9 centistokes at 100° F., and 129.3 centistokes at 210° F., and viscosity index was 98.7.

Example 4

Ethylene, 60 parts, and vinyloxyethanol, 20 parts, were interpolymerized in the presence of 20 parts acetone, all parts being by weight. Ditertiarybutyl peroxide, 0.5%, was employed as initiator and the polymerization conditions were approximately those of Example 1.

The acetone-soluble portion of the interpolymer oil was characterized as follows:

| | |
|---|---|
| Weight percent hydroxyl | 4.68 |
| Weight percent vinyloxyethanol | 24.3 |
| Gardner-Holt viscosity (stokes) | 5 |
| Pour point, ° F. | 20 |
| Specific viscosity (measurement at 25° C. on 5% solution in pyridine) | 0.195 |

The coefficient of friction was 0.122 dynes/square centimeter. Kinematic viscosity was 218.7 centistokes at 100° F. and 16.83 centistokes at 210° F. and viscosity index was 87.7.

A low molecular weight ethylene/vinylethanol interpolymer oil having a vinyloxyethanol content of about 13% by weight had a coefficient of friction of 0.138 dynes/square centimeter, as determined by the method employed in the examples above.

A low molecular weight vinyloxyethanol homopolymer was determined to have a coefficient of friction of 0.146 dynes/square centimeter.

Several samples of ethylene/vinyloxyethanol copolymer were tested for antiwear properties by the Shell 4-Ball Wear Test (600 r.p.m., 10 kilogram weight, 167° F., for one hour, 52–100 steel-on-steel). The ethylene-vinyloxyethanol copolymer of 42.5% vinyloxyethanol content had very good antiwear properties as shown by a scar diameter of only 0.27 mm. This compares very favorably with values such as 0.41 mm. for ethylene glycol, 0.48 mm. for white oil, 0.61 mm. for paraffin oil, and 0.45 mm. for tricresyl phosphate. An ethylene/vinyloxyethanol copolymer of 60% vinyloxyethanol content had a value of 0.29 mm., and a 24.7% vinyloxyethanol content copolymer also had a value below the 0.50 mm. value used as a criterion of antiwear properties.

While the friction tests above were made utilizing polished steel as contact, this metal was selected as a recognized standard for testing lubricants, and the results are translatable with reasonable accuracy to other metals such as other steels, irons, ferrous metals in general, polished chromes, etc., and in general, the results indicate the value of the interpolymers in reducing friction, particularly with respect to the foregoing metals, but also for aluminums, brasses, bronzes, coppers, etc.

The low coefficients of friction of the interpolymers of the present invention will, of course, suggest various lubricating uses, but only a few of the more important uses will be listed herein. The ethylene/vinyloxyethanol interpolymers can be used to lubricate metal bearings or in any other applications involving ferrous metals coated with lubricatnig films or in which a film of the interpolymers separates metal surfaces in close juxtaposition with each other, particularly when there is relative movement of the surfaces. The low molecular weight ethylene/vinyloxyethanol interpolymers will also be useful in various functional fluid applications, i.e., as automotive hydraulic brake fluids, power transfer fluids, and the like. In many lubrication and functional fluid applications, the ethylene/vinyloxyethanol interpolymers will be used in compositions along with other materials useful in such applications, e.g., along with mineral oils, and in some cases it will be desirable to modify the ethylene-vinyloxyethanol structure in various ways to improve compatibility with or solubility in such other materials. In addition, the free hydroxyl group of the low molecular weight ethylene/ vinyloxyethanol interpolymers provides a reactive site and makes the interpolymers suitable intermediates for the preparation of various modified polymers.

An application related to lubricating uses is the use of low molecular weight liquid or waxy ethylene/vinyloxyethanol interpolymers, or low molecular weight vinyloxyethanol homopolymers as leather softeners; the referred to polymers also make leather water repellant and more receptive to stains and polishes, and leathers impregnated with such polymers constitute part of the present invention. Leathers can suitably be impregnated by brushing or rubbing the stated polymers into the leather, or by merely permitting the polymer oils to soak into the leather.

It will be realized that the molecular weight values and percentages of monomer values in the copolymers as described herein represent averages and that values for some specific molecules may differ considerably from the average values. Fractionation of the copolymers into fractions soluble in acetone or hexane or neither tends to narrow the molecular weight and compositional differences, and it is believed that the acetone soluble fractions generally used in the test procedures herein had fairly narrow molecular weight and compositional distributions. However, the interpolymers have the desired properties regardless of their method of isolation, and, moreover, while narrow distributions are desirable for testing, it appears that fairly broad molecular weight and compositional distributions can be present in the interpolymers herein without adverse effect on coefficients of friction, so long as the averages are as described herein.

The low molecular weight ethyl/vinyloxyethanol interpolymers described are exemplified herein by low molecular weight ethylene/vinyloxyethanol copolymers, but it is apparent that substantially equivalent properties would be obtained if small amounts of other polymerizable vinyl monomers, e.g., up to 15% by weight or more vinyl acetate, were polymerized along with the ethylene and vinyloxyethanol, and embodiments including small amounts of such other vinyl monomers are considered within the scope of the interpolymers and copolymers of the present invention.

What is claimed is:

1. Ethylene/vinyloxyethanol copolymer oils, liquid at room temperature and having molecular weights in the range of about 200 to 1500.

2. The copolymer oils of claim 1 in which the vinyloxyethanol content of the copolymer is about 30% to about 60% by weight, said copolymer oils being characterized by low coefficients of friction for steel-to-steel contacts lubricated by same.

References Cited in the file of this patent

UNITED STATES PATENTS

| | | |
|---|---|---|
| 2,097,590 | Dreyfus | Nov. 2, 1937 |
| 2,748,170 | Benoit et al. | May 29, 1956 |
| 2,789,093 | Foehr | Apr. 16, 1957 |
| 2,829,174 | Lane | Apr. 1, 1958 |
| 2,842,499 | Cottle et al. | July 8, 1958 |
| 2,941,010 | Mann et al. | June 14, 1960 |

FOREIGN PATENTS

| | | |
|---|---|---|
| 486,097 | Canada | Aug. 26, 1952 |